US007648715B2

(12) United States Patent
Mistry et al.

(10) Patent No.: US 7,648,715 B2

(45) Date of Patent: Jan. 19, 2010

(54) COLOURANTS ENCAPSULATED IN POLYMER MATRIX

(75) Inventors: Kishor Kumar Mistry, Bradford (GB); Kenneth Charles Symes, Keighley (GB); Janine Andrea Preston, Leeds (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 547 days.

(21) Appl. No.: 10/475,480

(22) PCT Filed: Apr. 19, 2002

(86) PCT No.: PCT/EP02/04348

§ 371 (c)(1), (2), (4) Date: Oct. 20, 2003

(87) PCT Pub. No.: WO02/090445

PCT Pub. Date: Nov. 14, 2002

(65) Prior Publication Data

US 2004/0136933 A1 Jul. 15, 2004

(30) Foreign Application Priority Data

May 4, 2001 (GB) ................................ 0110989.1

(51) Int. Cl.
*A61K 9/14* (2006.01)

(52) U.S. Cl. ..................................................... 424/487

(58) Field of Classification Search ....................... None
See application file for complete search history.

(56) References Cited

U.S. PATENT DOCUMENTS 3,876,603 A * 4/1975 Makhlouf .................. 523/210
5,219,918 A * 6/1993 Guillaume et al. .......... 524/547
5,681,880 A * 10/1997 Desor et al. ................ 524/320
5,744,152 A * 4/1998 Langley et al. ............. 424/408
5,961,989 A * 10/1999 Mougin et al. ............. 424/401
5,973,054 A 10/1999 Kushino et al. ............ 524/457
2002/0177655 A1* 11/2002 Pratt et al. ................. 524/802

FOREIGN PATENT DOCUMENTS

| | | |
|---|---|---|
| EP | 1 070 739 | 1/2001 |
| JP | 63258970 | 10/1988 |
| JP | 2045535 | 2/1990 |
| JP | 10-48882 | 8/1996 |
| JP | 10-298296 | 11/1998 |
| JP | 2000109736 | 4/2000 |
| JP | 2001-64537 | 3/2001 |
| WO | 97/24178 | 7/1997 |

OTHER PUBLICATIONS

Derwent abstract No. 90-094608/13 of JP 2045535.
Derwent abstract No. 2001-150063/16 of JP 2000109736.
Derwent abstract No. 99-040778/04 of JP 10-298296.
Derwent abstract No. 88-348841/49 of JP 63258970.

* cited by examiner

*Primary Examiner*—Michael P Woodward
*Assistant Examiner*—Bethany Barham
(74) *Attorney, Agent, or Firm*—Shiela A. Loggins

(57) ABSTRACT

Polymeric particles comprising a polymeric matrix and colourant distributed throughout the matrix, wherein the polymeric matrix that has been formed from a blend of monomers comprising a first monomer which is an ethylenically unsaturated ionic monomer and a second monomer which is an ethylenically unsaturated hydrophobic monomer which is capable of forming a homopolymer of glass transition temperature in excess of 50° C., and in which the first monomer is a salt of a volatile counterion component, characterized in that the polymeric matrix is impermeable to the colourant The particles obtainable by the process of the invention can be used in a variety of industrial processes, for instance in the manufacture of inks, paper and cosmetics.

16 Claims, 1 Drawing Sheet

COLOURANTS ENCAPSULATED IN POLYMER MATRIX

Figure 1:
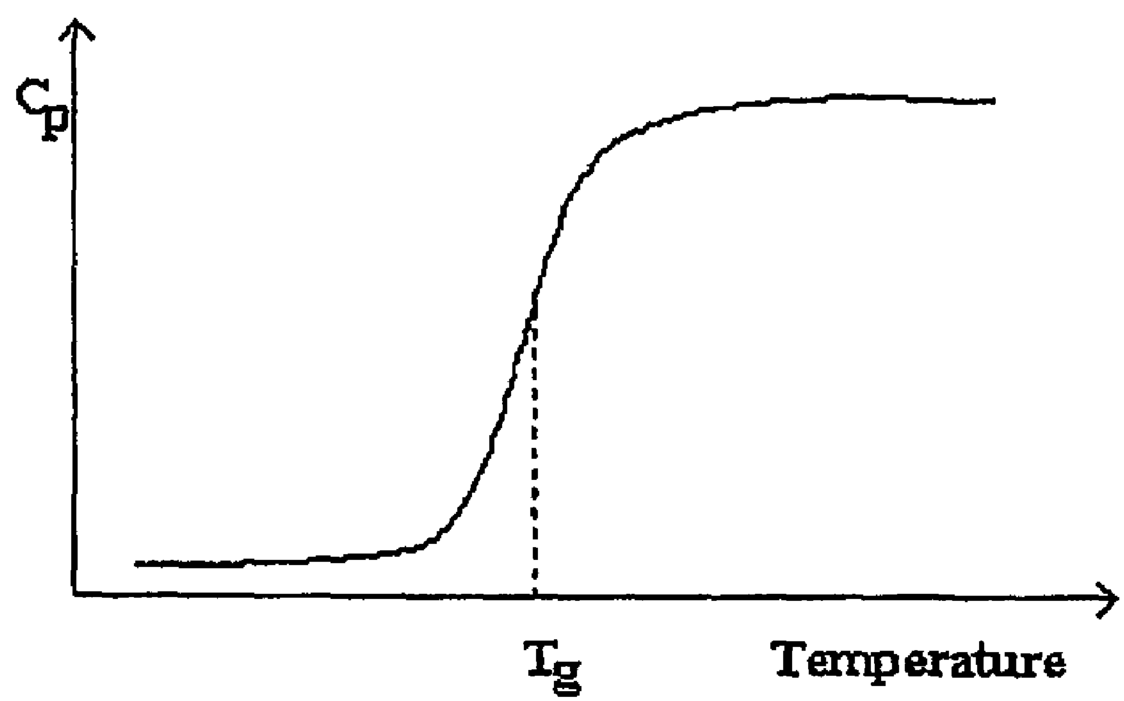

The present invention concerns a process for making polymeric particles containing entrapped colourants.

Entrapment of active ingredients can be achieved by a number of processes. Some of these techniques involve forming a polymeric shell around a central core or active ingredient. Other methods involve preparing a matrix of polymeric material throughout which an active ingredient is distributed.

Various methods for making capsules have been proposed in the literature. For instance it is known to encapsulate hydrophobic liquids by dispersing the hydrophobic liquid into an aqueous medium containing a melamine formaldehyde pre-condensate and then reducing the pH resulting in an impervious aminoplast resin shell wall surrounding the hydrophobic liquid. Variations of this type of process are described in GB-A-2073132, AU-A-27028/88 and GB-A-1507739, in which the capsules are preferably used to provide encapsulated inks for use in pressure sensitive carbonless copy paper.

However, although capsules based on melamine formaldehyde resins are both impervious and durable, they tend to suffer the disadvantage that they are less impermeable at elevated temperatures. In addition there is also risk that at elevated temperatures formaldehyde is evolved.

Typical techniques for forming a polymer shell are described in, for instance, GB 1,275,712, 1,475,229 and 1,507,739, DE 3,545,803 and U.S. Pat. No. 3,591,090.

In U.S. Pat. No. 3,838,007 droplets of enzyme dispersed in an aqueous solution of, for instance, gelatin are dispersed into water and then cross-linked, to give cross linked particles of the gelatin containing the enzyme.

In EP-A-356,240 processes for encapsulating enzyme or other biologically produced material; in a matrix of polymeric material by mixing the polymeric material with aqueous liquor containing the biologically produced material, dispersing this mixture in a water immiscible liquid and azeotroping the dispersion. The product can either be relatively coarse beads that can be recovered or a stable dispersion of small particles in the water immiscible liquid.

In EP-A-356,239 there is a description of various compositions and processes primarily intended for the encapsulation of enzymes for liquid or other detergents. One type of product described therein comprises particles having a core comprising matrix polymer containing the enzyme, oil around the core and a polymer shell around the oil.

Particles of a matrix polymer containing an active ingredient can be formed as a dispersion in oil and this dispersion can then be dispersed in aqueous solution of an encapsulating polymer or blend of polymers and polymer deposition can then be caused to occur around the oil particles that contain the particles of matrix polymer that contain the active ingredient.

U.S. Pat. No. 5,744,152 describes a process for forming polymer particles introduced as a solution of a water soluble salt with a volatile amine of a polymer that is relatively insoluble and non-swelling in acid throughout which the active ingredient is dispersed or dissolved, and which the solution is heated to form the dry matrix and to volatilise the amine and thereby form a polymer that is insoluble in acid. The release of an active ingredient can be controlled by careful adjustment of the pH. This method is specifically designed for the entrapment of relatively large sized ingredients, in particular enzymes, fungi, spores, bacteria, cells or antibiotics, which are released by pH adjustment as a suitable release mechanism.

WO 97/24178 describes a particulate composition comprises particles having a polymeric matrix including a detergency active ingredient, wherein the polymeric matrix is formed of a free base form of a cationic polymer which is a co-polymer of an ethylenically unsaturated hydrophobic monomer with an ethylenically unsaturated substituted amine monomer. The matrix particles can be made by polymerising the free base monomer and the hydrophobic monomer while dissolved In an organic solvent so as to form a solution of the free base polymer inorganic solvent. This is followed by addition of an aqueous solution of a volatile acid wherein the solvent has higher volatility than the acid. The solvent is then distilled off so as to leave a solution in water of the salt form of the polymer. A suitable volatile acid is acetic acid, in which event a suitable solvent is n-butyl acetate. The active ingredients particularly include enzymes which can be released by dilution of the medium in which they are contained.

All of the aforementioned references are concerned with entrapment or encapsulation of active ingredients, which are to be released at a later stage and thus do not give any indication of how to achieve permanent entrapment of materials, particularly relatively small sized species A variety of techniques are known for providing encapsulated or entrapped colourants.

WO 91/06277 describes cosmetic formulations which have activatable dormant. pigments dispersed in an anhydrous base or vehicle. Ground pigment or liquid carrier dispersion is microencapsulated to form stable, dry, free flowing powder of micro-sized particles. The preferred process of encapsulation is by coacervation e.g. by emulsifying a liquid dispersion in a continuous, external aqueous phase to form micro-sized droplets and a complex of colloidal material is added to the external phase in such a way to form a deposit on or around each droplet thereby forming an outer wall or shell. The microcapsules are intended to rupture and release the dormant pigment when subjected to physical forces.

U.S. Pat. No. 5,234,711 concerns methods of encapsulating pigment particles useful in manufacturing of cosmetic products. It is an objective of this disclosure to employ a vinyl-polymeric encapsulation process for increasing the wettability, dispersibility and heat resistance of the pigment particles. The method encapsulation involves redox or free radical vinyl polymerisation in an aqueos medium.

EP 225799 describes microencapsulated solid non-magnetic colourant material in a liquid, gel, waxy or low temperature melting solid carrier phase which is encapsulated within a polymeric shell. Absorbed onto the shell is a silane or titanate coupling agent which increases the oleophilicity of the surface of the solid colourant material.

EP 445342 relates to a cosmetic composition comprising a pigment that has been formed by incorporating a solvated dye into a resin and admixing with a cosmetic carrier. The amount of pigment present is sufficient to provide attractive amount of pigment present sufficient to provide an attractive cosmetic effect when applied to skin, nails or hair. Any cosmetically acceptable soluble dye can be used. Any resin may be used provided it can be pulverised to a fine powder. The solvated dye, may be incorporated into the resin by adding to the plasticised or molten resin; or by dissolving the dye in a solution of unpolymerised resin and mutual solvent for the dye and the resin, then polymerising the resin, or by contacting the dye with the resin. The dye impregnated resin powders are said to be used in a variety of cosmetic compositions.

Nevertheless there is a need to provide products containing entrapped or encapsulated colourants, which products retain the colourant over longer periods and also when subjected to different environments. This is especially so in the case of oil soluble and particularly water soluble dyes, where it is generally difficult to permanently retain the dye. In a cosmetic composition if the dye is not permanently retained, this can impair the long term visual effect of the cosmetic.

An objective of the present invention is to provide polymer entrapped colourants in which the colourant does not leach out even after prolonged use. Specifically it would be desirable to provide a process for entrapping solutions of dyes in polymeric particles for incorporation into cosmetic formulations and wherein the dyes remain permanently entrapped and are not released before during or after application.

In addition encapsulation or entrapment of colourants can result in visual impairment of the colourant. This may be as a result of the polymer absorbing light from certain wavelengths or sometimes as a result of the irregular morphology of the polymer particles.

In addition it is also an objective to provide an alternative method for converting oil soluble or water dyes into a product which can be used as a pigment in a variety of applications.

Thus a further objective of the present is to provide polymer entrapped colourants which yield improved visual effects Thus according to the present invention we provide polymeric particles comprising a polymeric matrix and colourant distributed throughout the matrix, wherein the polymeric matrix that has been formed from a blend of monomers comprising a first monomer which is an ethylenically unsaturated ionic monomer and a second monomer which is an ethylenically unsaturated hydrophobic monomer which is capable of forming a homopolymer of glass transition temperature in excess of 50° C., and in which the first monomer is a salt of a volatile counterion component, characterised in that the polymeric matrix is impermeable to the colourant.

In a further aspect of the present invention we provide a process of preparing polymeric particles comprising a polymeric matrix and colourant distributed throughout the matrix, wherein the polymeric matrix that has been formed from a blend of monomers comprising a first monomer which is an ethylenically unsaturated ionic monomer and a second monomer which is an ethylenically unsaturated hydrophobic monomer which is capable of forming a homopolymer of glass transition temperature in excess of 50° C., and in which the first monomer is a salt of a voltile counterion component, wherein the polymeric matrix is impermeable to the colourant, which process comprises the steps, A) providing an aqueous phase of a polymeric salt formed from a monomer blend which comprises the first and second B) dissolving or dispersing the colourant with the aqueous phase, C) forming a dispersion consisting essentially of the aqueous phase in a water immiscible liquid phase which comprises an amphipathic polymeric stabiliser to form an emulsion, and D) subjecting the dispersion to dehydration wherein water is evaporated from the aqueous particles thereby forming solid particles comprising the colourant distributed throughout the matrix polymer, wherein volatile counterion component of the salt is evaporated during the distillation and the matrix polymer is converted to its free acid or free base form.

The particles according to the first aspect of the invention and the products resulting from the process according to the second aspect of the invention have enhanced visual performance and furthermore the polymer matrix does not allow any of the entrapped colourant to be released even under prolonged use.

The polymeric products can be further enhanced if the polymeric matrix is cross-linked. This cross-linking can be as a result of including a cross-liking step in the process. This can be achieved by including self cross-linking groups in the polymer, for instance monomer repeating units carrying a methylol functionality. Preferably though the cross-linking is achieved by including a cross-linking agent with the aqueous phase polymer. The cross-linking agent are generally compounds which react with functional groups on the polymer chain. For instance when the polymer chain contains anionic groups a suitable cross-linking agent may be aziridine, diepoxides, carbodiamides, silanes or a multivalent metal, for instance aluminium or zirconium. One particularly preferred cross-linking agent is ammonium zirconium carbonate. Another particularly preferred class of cross-linking agent include compounds which from covalent bonds between polymer chains, for instance silanes or diepoxides.

The cross-linking process desirably occurs during the dehydration step. Thus where a cross-linking agent is included, it will generally remain dormant until the dehydration is started.

We have found that polymers formed from the special combination of hydrophobic monomer that are capable of forming a homopolymer of glass transition temperature in excess of 50° C., preferably greater than 60 or 80° C. exhibit considerably improved performance in regard to the impermeability to the colourant. By hydrophobic monomer we mean that the monomer has a solubility in water of less than 5 g per 100 ml water.

Glass transition temperature (Tg) for a polymer is defined in the Encycopedia of Chemical Technology, Volume 19, fourth edition, page 891 as the temperature below which (1) the transitional motion of entire molecules and (2) the coiling and uncoiling of 40 to 50 carbon atom segments of chains are both frozen. Thus below its Tg a polymer would not to exhibit flow or rubber elasticity. The Tg of a polymer may be determined using Differential Scanning Calorimetry (DSC). Thus a reference sample with known Tg and the experimental sample are heated separately but in parallel according to a linear temperature programme. The two heaters maintain the two samples at identical temperatures. The power supplied to the two heaters to achieve this is monitored and the difference between them plotted as a function of reference temperature which translates as a recording of the specific heat as a function of temperature. As the reference temperature is increased or decreased and the experimental sample approaches a transition the amount of heat required to maintain the temperature will be greater or lesser depending on whether the transition is endothermic or exothermic. A typical plot indicating the glass transition temperature is shown in FIG. 1.

Generally the average particle size diameter of the particles is less than about 100 microns. Usually the average particle size diameter tends to be smaller, for instance less than 70 or 80 microns, often less than 40 or 50 microns and typically the average particle diameter will be between 750 nanometers and 40 microns. Preferably the average particle size diameter is in the range 10 to 40 microns usually between 20 and 40 microns. Average particle size is determined by a Coulter particle size analyser according to standard procedures well documented in the literature.

Without being limited to theory it is believed that the particular combination of ionic monomer and said hydrophobic monomer provides polymers with the right degree of hydrophilicity and hardness that seems to be responsible for the improvements in impermeability to the colourant.

Specific examples of said hydrophobic monomers include styrene, methyl methacrylate, tertiary butyl methacrylate, phenyl methacrylate, cyclohexyl methacrylate and isobornyl methacrylate.

It has been found that it is not possible to replace the hydrophobic monomers with ethylenically unsaturated carboxylic acid esters that are not capable of forming a hompolymer that has a glass transition temperature of at least 50° C. without adversely increasing the permeability of the polymer. Preferably still the Tg should be at least 60° C. or even at least 80° C. For instance substituting the hydrophobic monomer of the present invention by other (meth)acrylic esters, for instance 2-ethyl hexyl acrylate would be unsuitable. Best results are generally obtained by use of monomers which are capable of forming polymers of very high Tg. Therefore less preferred products would be produced using ethyl acrylate or propyl acrylate as the hydrophobic monomer.

The ionic monomer may contain either anionic or cationic groups or alternatively may be potentially ionic, for instance in the form of an acid anhydride. Preferably the ionic monomer is an ethylenically unsaturated anionic or potentially anionic monomer. Suitable anionic monomer include (meth) acrylic acid, maleic acid, maleic anhydride, itaconic acid, itaconic acid anhydride, crotonic acid, (meth)allyl sulphonic acid, vinyl sulphonic acid and 2-acrylamido-2-methyl propane sulphonic acid. Preferred anionic monomers are carboxylic acids or acid anydrides.

When the ionic monomer is anionic, for Instance a carboxylic acid or anhydride the volatile counterion may be ammonia or a volatile amine component. Thus the polymer may be produced in free acid form and then neutralised with an aqueous solution of ammonium hydroxide or a volatile amine, for instance ethanolamine. Alternatively the polymer may be prepared by copolymerising the ammonium or volatile amine salt of an anionic monomer with the hydrophobic monomer.

Generally the matrix polymer may be prepared by any suitable polymerisation process. For instance the polymer can be conveniently prepared by aqueous emulsion polymerisation for instance as described in EP-A-697423 or U.S. Pat. No. 5,070,136. The polymer can then be neutralised by the addition of an aqueous solution of ammonium hydroxide or a volatile amine.

In a typical polymerisation process the blend of hydrophobic monomer and anionic monomer is emulsified into an aqueous phase which contains a suitable amount of emulsifying agent. Typically the emulsifying agent may be any commercially available emulsifying agents suitable for forming aqueous emulsion. Desirably these emulsifying agents will tend to be more soluble in the aqueous phase than in the monomer water immiscible phase and thus will tend to exhibit a high hydrophilic lipophilic balance (HLB). Emulsification of the monomer may be effected by known emulsification techniques, including subjecting the monomer/aqueous phase to vigorous stirring or shearing or alternatively passing the monomer/aqueous phase through a screen or mesh. Polymerisation may then be effected by use if suitable initiator systems, for instance UV initiator or thermal initiator. A suitable techniques of initiating the polymerisation would be to elevate the temperature of the aqueous emulsion of monomer to above 70 or 80° C. and then add between 50 and 1000 ppm ammonium persulphate by weight of monomer.

Generally the matrix polymer has a molecular weight of up to 200,000 (Determined by GPC using the industry standard parameters). Preferably the polymer has a molecular weight of below 50,000, for instance 2,000 to 20,000. Usually the optimum molecular weight for the matrix polymer is around 8,000 to 12,000.

Typically the monomer blend may contain at least 50% by weight hydrophobic monomer, the remainder being made up of anionic monomer. Generally though the hydrophobic monomer will be present in amounts of at least 60% by weight. Preferred compositions contain between 65 and 90% by weight hydrophobic polymer, for instance around 70 or 75%.

A particularly preferred matrix polymer is a copolymer of styrene with ammonium acrylate. More preferably this polymer is used when the process employs a cross-linking agent, which is especially ammonium zirconium carbonate.

In an alternative version of the process of the present invention the ionic monomer may be cationic or potentially cationic, for instance an ethylenically unsaturated amine. In this form of the invention the volatile counterionic component is a volatile acid component. Thus in this form of the invention the matrix polymer can be formed in an analogous way to the aforementioned anionic matrix polymer, except that the anion monomer is replaced by a cationic or potentially cationic monomer. Generally where the polymer is prepared in the form of a copolymer of a free amine and hydrophobic monomer, it is neutralised by including a suitable volatile acid, for instance acetic acid, formic acid or even carbonic acid. Preferably the polymer is neutralised by a volatile carboxylic acid.

The amount of cationic or potentially cationic monomer to hydrophobic monomer is generally the same as for the aforementioned anionic monomer.

The particles may entrap one or more colourants and the colourant may be any colourant, for instance a dye, pigment or lake. Typically suitable colourants include any organic or inorganic pigment or colourant approved for use in cosmetics by CTFA and the FDA such as lakes, iron oxides, titanium dioxide, iron sulphides or other conventional pigments used in cosmetic formulations. Examples of the pigment include an inorganic pigment such as carbon black, D&C Red 7, calcium lake, D&C Red 30, talc Lake, D&C Red 6, barium lake, Russet iron oxide, yellow iron oxide, brown iron oxide, talc, kaolin, mica, mica titanium, red iron oxide, magnesium silicate and titanium oxide; and organic pigment such as Red No 202, Red No 204, Red No 205, Red No 206, Red No 219, Red No 228, Red No 404, Yellow No 205, Yellow No 401, Orange No 401 and Blue No 404. Examples of oil soluble dyes include Red No 505, Red No 501, Red No 225, Yellow No 404, Yellow No 405, Yellow No 204, Orange No 403, Blue No 403, Green No 202 and Purple No 201. Examples of vat dyes are Red No 226, Blue No 204 and Blue No 201. Examples of lake dye include various acid dyes which are laked with aluminum, calcium or barium.

Conventional dyes may also be used and may be either oil or water soluble. Preferably the colourant is an aqueous solution of a water soluble dye. Suitable dyes for the present invention include FD & C Blue No 11, FD & C Blue No 12, FD &C Green No 13, FD & C Red No 13, FD & C Red No 140, FD&C Yellow No. 15, FD&C Yellow No. 16, D&C Blue No. 14, D&C Blue No. 19, D&C Green No. 15, D&C Green No. 16, D&C Green No. 18, D&C Orange No. 14, D&C Orange No. 15, D&C Orange No. 110, D&C Orange NO. 111, D&C Orange NO. 117, FD&C Red No. 14, D&C Red No. 16, D&C Red No. 17, D&C Red No. 18, D&C Red No. 19, D&C Red No. 117, D&C Red No. 119, D&C Red No. 121, D&C Red No. 122, D&C Red No. 127, D&C Red No. 128, D&C Red No. 130, D&C Red No. 131, D&C Red No.

134, D&C Red No. 139, FD&C Red No. 140, D&C Violet No. 12, D&C Yellow No. 17, Ext. D&C Yellow No. 17, D&C Yellow No. 18, D&C Yellow No. 111, D&C Brown No. 11, Ext. D&C Violet No. 12, D&C Blue No. 16 and D&C Yellow No. 110. Such dyes are well known, commercially available materials, with their chemical structure being described, e.g., in 21 C.F.R. Part 74 (as revised Apr. 1, 1988) and the CTFA Cosmetic Ingredient Handbook, (1988), published by the Cosmetics, Toiletry and Fragrancy Association, Inc. These publications are incorporated herein by reference.

The colourant can be a substance which is a dormant colourant, for instance a colour former which exhibits a colour on exposure to a suitable trigger mechanism, for instance heat or irradiation. Suitably such entrapped colour formers can be coated onto or incorporated into a suitable substrates and then treated to exhibit the colour. The advantage of providing colour formers as polymeric particles is that they can be more easily be processed and incorporated into the substrate in a desired way. The colour former can still be activated even though it is entrapped within the polymer particle.

The colourant may also be a fluorescent compound and/or a chromophor compound. Suitably the colourant can be fluorescent whitening agent (FWA).

The process of the present invention involves dispersing the aqueous solution of matrix polymer containing colourant into a water immiscible liquid. Typically the water immiscible liquid is an organic liquid or blend of organic liquids. The preferred organic liquid is a mixture of a non-volatile paraffin oil and a volatile paraffin oil. The two oils may be used in equal proportions by weight, but generally it is often preferred to use the non-volatile oil in excess, for instance greater than 50 to 75 parts by weight of the non-volatile oil to 25 to less than 50 parts by weight of the volatile oil.

In the process according to the second aspect of the invention it is desirable to the present invention to include a polymeric amphipathic stabiliser in the water immiscible liquid. The amphipathic stabiliser may be any suitable commercially available amphipathic stabiliser, for instance HYPERMER (RTM) (available from ICI). Suitable stabilisers also include the stabilisers described in WO-A-97/24179. Although it is possible to include other stabilising materials in addition to the amphipathic stabiliser, such as surfactants, it is generally preferred that the sole stabilising material is the amphipathic stabiliser.

In the process of the present invention the dehydration step can be achieved by any convenient means. Desirably dehydration can be effected by subjecting the dispersion In oil to vacuum distillation. Generally this will require elevated temperatures, for instance temperatures of 30° C. or higher. Although it may be possible to use much higher temperatures e.g. 80 to 90° C. it is generally preferred to use temperatures of below 60 or 70° C.

Instead of vacuum distillation it may be desirable to effect dehydration by spray drying. Suitably this can be achieved by the spray drying process described in WO-A-97/34945.

The dehydration step removes water from the aqueous solution of matrix polymer and also the volatile counterion component, resulting in a dry polymer matrix which is insoluble an non-swellable in water, containing therein the colourant which is distributed throughout the polymeric matrix.

The invention also includes the polymeric particles which are obtainable by the process of the second aspect of the present invention.

In a further aspect of the present invention we provide a cosmetic composition comprising a cosmetically acceptable base and polymeric particles in accordance with the first aspect of the invention or products obtained according to the process of the second aspect of the invention.

The following examples illustrate the invention.

EXAMPLE 1

Preparation of Blue Dye Polymer Particles in Oil

An aqueous solution is formed by dissolving 10 g of Cibracron Blue P2Rdye in 396 g of 25% solution of a copolymer of styrene and ammonium acrylate and then addition of 9.9 g of 50% ammonium zirconium carbonate.

An oil solution is prepared by mixing 50 g of 20% polymeric stabiliser, 89 g of Kristol M14 oil and 70.4 g of Isopar G solvent.

The aqueous solution is added to the agitated oil solution and then homogrenised with a high shear Silverson mixer to form a water-in-oil emulsion. After 15 minutes of emulsification, extra 179 g of Isopar G is added as a diluent.

The resulting emulsion is transferred to a resin pot having vacuum distillation capabilities. The emulsion is warmed to 25° C. and water/Isopar G mixture distilled under reduced pressure a constant temperature of about 30° C. The volume of water and solvent is monitored and distillation continued until no further water is collected in the distillate and then temperature is allowed to rise to 100° C. under vacuum. The dried dye polymer particles in oil are then held at 100° C. for 60 minutes to drive off ammonia and crosslink the carboxylated styrene based matrix polymer to the water insoluble form.

The contents of flask are cooled. The dispersion of Dye polymer particles in oil is stable and having an average of diameter of less than 2 microns.

EXAMPLE 2

Preparation of Red Dye Polymer Particles in Oil

Example 1 was repeated with the exception that 10 g of a water soluble red was used in place of the Cibracron Blue dye.

A red dye polymer particle dispersion in oil was obtained.

EXAMPLE 3

Preparation of Red Pigment Polymer Particles in Oil

Example 1 was repeated with the exception that 10 g of a red pigment was dispersed in the aqueous solution of the polymer solution.

A dispersion in oil of red pigment encapsulated in a polymer matrix was obtained.

EXAMPLE 4

Dehydration Using Spray Drying

Example 1 was repeated except instead of dehydrating using vacuum distillation, the spray drying process described by Example 1 of WO-A-97/34945 was used.

The invention claimed is:

1. Polymeric particles comprising a polymeric matrix and colourant distributed throughout the matrix, wherein the polymeric matrix has been formed from a blend of monomers comprising a first monomer which is an ethylenically unsaturated ionic monomer which is anionic, and the anionic monomer is (meth)acrylic acid and at least 60 wt. % of a second monomer which is an ethylenically unsaturated hydrophobic monomer which is capable of forming a homopolymer of glass transition temperature in excess of 80° C., wherein the second monomer is selected from the group consisting of styrene, methyl methacrylate, tertiary butyl methacrylate, phenyl methacrylate, cyclohexyl methacrylate and isobornyl methacrylate, and in which the first monomer is a salt of ammonia or a volatile amine wherein the polymeric matrix is crosslinked, the polymeric matrix exhibits improved performance in regard to the impermeability of the colorant and the colourant is selected from the group consisting of pigments, dyes and lakes.

2. Polymeric particles according to claim 1 in which the polymeric matrix comprises a polymer which is in the free acid form.

3. Polymeric particles according to claim 1 in which the polymeric particles have an average particle size of below 100 microns.

4. Polymeric particles according to claim 1 in which the matrix polymer is a copolymer of styrene with ammonium acrylate and ammonium zirconium carbonate is used as a cross-linking agent.

5. A process of preparing polymeric particles comprising a polymeric matrix and colourant distributed throughout the matrix, wherein the polymeric matrix has been formed from a blend of monomers comprising a first monomer which is an ethylenically unsaturated monomer which is anionic which anionic monomer is selected from the group consisting of (meth)acrylic acid, and at least 60 wt. % of a second monomer which is an ethylenically unsaturated hydrophobic monomer which is capable of forming a homopolymer of glass transition temperature in excess of 80° C., wherein the second monomer is selected from the group consisting of styrene, methyl methacrylate, tertiary butyl methacrylate, phenyl methacrylate, cyclohexyl methacrylate and isobornyl methacrylate, and in which the first monomer is a salt of ammonia or a volatile amine and the polymeric matrix exhibits improved performance in regard to the impermeability of the colorant and the colourant is selected from the group consisting of pigments, dyes and lakes, which process comprises the steps, A) providing an aqueous phase of a polymeric salt formed from a monomer blend which comprises the first and second monomers and a cross-linking agent, B) dissolving or dispersing the colourant with the aqueous phase, C) forming a dispersion consisting essentially of the aqueous phase in a water immiscible liquid phase which, and D) subjecting the dispersion to dehydration wherein water is evaporated from the aqueous particles thereby forming solid particles comprising the colourant distributed throughout the matrix polymer, wherein the volatile counterion component of the salt is evaporated during the distillation and the matrix polymer is converted to its free acid and the matrix polymer becomes cross-linked during the dehydration step.

6. A process according to claim 5 in which the polymeric particles have an average particle size of below 100 microns.

7. A process according to claim 5 in which the polymeric matrix is a copolymer of styrene with ammonium acrylate and ammonium zirconium carbonate is used as a cross-linking agent.

8. A process according to claim 5 in which the dehydration step involves vacuum distillation.

9. A process according to claim 5 in which the dehydration step involves spray dying.

10. A cosmetic composition comprising a cosmetically acceptable base and polymeric particles as defined by claim 1.

11. A cosmetic composition comprising a cosmetically acceptable base and polymeric particles as prepared by the process according to claim 5.

12. A process according to claim 5 in which the colourant is an aqueous solution of a water soluble dye.

13. The polymeric particles according to claim 1, wherein the polymeric matrix has a molecular weight of below 50,000.

14. The polymeric particles according to claim 1, wherein the wt. % of the hydrophobic monomer is between 65 and 90 wt. %.

15. The polymeric particles according to claim 1, wherein the polymeric matrix has a molecular weight of 2,000 up to 200,000.

16. Polymeric particles according to claim 1 wherein the second monomer is styrene.

* * * * *

UNITED STATES PATENT AND TRADEMARK OFFICE

CERTIFICATE OF CORRECTION

PATENT NO. : 7,648,715 B2
APPLICATION NO. : 10/475480
DATED : January 19, 2010
INVENTOR(S) : Mistry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 789 days.

Signed and Sealed this

Twenty-third Day of November, 2010

David J. Kappos
*Director of the United States Patent and Trademark Office*